US009928000B2

(12) United States Patent
Klein et al.

(10) Patent No.: US 9,928,000 B2
(45) Date of Patent: *Mar. 27, 2018

(54) MEMORY MAPPING FOR OBJECT-BASED STORAGE DEVICES

(71) Applicant: International Business Machines Corporation, Armonk, NY (US)

(72) Inventors: Matthias Klein, Wappingers Falls, NY (US); Marco Kraemer, Sindelfingen (DE); Carsten Otte, Stuttgart (DE); Christoph Raisch, Gerlingen (DE)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/090,765

(22) Filed: Apr. 5, 2016

(65) Prior Publication Data

US 2017/0139636 A1 May 18, 2017

Related U.S. Application Data

(63) Continuation of application No. 14/939,063, filed on Nov. 12, 2015.

(51) Int. Cl.
*G06F 3/06* (2006.01)
*G06F 12/10* (2016.01)
*G06F 12/1027* (2016.01)

(52) U.S. Cl.
CPC .......... *G06F 3/0644* (2013.01); *G06F 3/0604* (2013.01); *G06F 3/0673* (2013.01); *G06F 12/1027* (2013.01); *G06F 2212/68* (2013.01)

(58) Field of Classification Search
CPC ............... G06F 12/1027; G06F 12/109; G06F 12/1009; G06F 9/5077; G06F 12/023;
(Continued)

(56) References Cited

U.S. PATENT DOCUMENTS 8,549,252 B2   10/2013   Mane
8,645,460 B2   2/2014   Feng et al.
(Continued)

OTHER PUBLICATIONS

Caulfield, et al.; "Providing Safe, User Space Access to Fast, Solid State Disks"; ASPLOS' 12; Mar. 3-7, 2012; Copyright 2012 ACM; pp. 387-399.
Goodell, et al.; "An Evolutionary Path to Object Storage Access"; IEEE Computer Society; 2012 SC Companion: High Performance Computing, Networking Storage and Analysis, Copyright 2013, pp. 36-41.
(Continued)

*Primary Examiner* — Michael Alsip
(74) *Attorney, Agent, or Firm* — Edward J. Wixted, III; Aaron N. Pontikos

(57) ABSTRACT

In an approach for determining a physical address for object access in an object-based storage device (OSD) system, a processor divides a first data object into one or more partitions, including at least a first partition, and providing each partition for storage as individual stored objects in an OSD system. A processor adds a first entry in a page table, the first entry representing the first partition without an indication of a physical address. A memory management unit (MMU) of the OSD system receives a first request of the first partition. Responsive to receiving the first request of the first partition, a MMU identifies that the first entry of the page table represents the first partition. A MMU obtains a physical address of the first partition from one of a hardware component and a firmware component.

11 Claims, 7 Drawing Sheets

(58) Field of Classification Search
CPC ......... G06F 2212/1044; G06F 2212/68; G06F 2212/656; G06F 2212/684
See application file for complete search history.

(56) References Cited

U.S. PATENT DOCUMENTS

| | | | |
|---|---|---|---|
| 8,966,191 | B2 | 2/2015 | Flynn et al. |
| 9,002,795 | B2 | 4/2015 | Messinger et al. |
| 9,003,104 | B2 | 4/2015 | Joshi et al. |
| 2006/0053287 | A1* | 3/2006 | Kitamura ............ G06F 11/1076 713/167 |
| 2013/0111151 | A1* | 5/2013 | Sedlar ................. G06F 12/0292 711/145 |
| 2013/0205114 | A1 | 8/2013 | Badam et al. |
| 2013/0254477 | A1 | 9/2013 | Swanson et al. |
| 2014/0250256 | A1 | 9/2014 | Duran |

OTHER PUBLICATIONS

Youhui, et al.; "Employing intelligence in object-based storage devices to provide attribute-based file access"; Science China; Mar. 2013; vol. 56; pp. 1-10.

"Information Technology—Fibre Channel Protocol for SCSI, Fourth Version (FCP-4)"; Project 1828-D; Revision 02b; Jan. 3, 2011; Printed Jan. 3, 2011; pp. 1-147.

"Information Technology—SCSI Object-Based Storage Device Commands (OSD)"; Project T10/1355-D; Revision 10; Jul. 30, 2004; Printed Jul. 30, 2004; pp. 1-187.

"Information Technology—SCSI Object-Based Storage Device Commands-2 (OSD-2)"; Project T10/1729-D; Revision 5; Jan. 16, 2009; Printed May 21, 2009; pp. 1-342.

U.S. Appl. No. 14/939,063, filed Nov. 12, 2015, Entitled "Memory Mapping for Object-Based Storage Devices", 46 pages.

List of IBM Patents or Patent Applications Treated as Related, Dated Apr. 5, 2016, 2 pages.

* cited by examiner

MEMORY MAPPING FOR OBJECT-BASED STORAGE DEVICES

BACKGROUND

The present invention relates to the field of digital computer systems, and more specifically, to a method for object access in an object-based storage system.

Object-based storage (OSD) is a storage architecture that manages data as objects, as opposed to other storage architectures like file systems which manage data as a file hierarchy and block storage which manages data as blocks within sectors and tracks. Each object typically includes the data itself, a variable amount of metadata, and a globally unique identifier. OSD technology is being developed at the system level. Data is addressed as objects and the physical location and organization of data is hidden from hosts and is managed by object storage systems.

SUMMARY

Aspects of an embodiment of the present invention disclose a method, computer program product, and computing system for determining a physical address for object access in an object-based storage device (OSD) system. A processor divides a first data object into one or more partitions, including at least a first partition, and providing each partition for storage as individual stored objects in an OSD system. A processor adds a first entry in a page table, the first entry representing the first partition without an indication of a physical address. A memory management unit (MMU) of the OSD system receives a first request of the first partition. Responsive to receiving the first request of the first partition, a MMU identifies that the first entry of the page table represents the first partition. A MMU obtains a physical address of the first partition from one of a hardware component and a firmware component.

DETAILED DESCRIPTION

Figure 1:
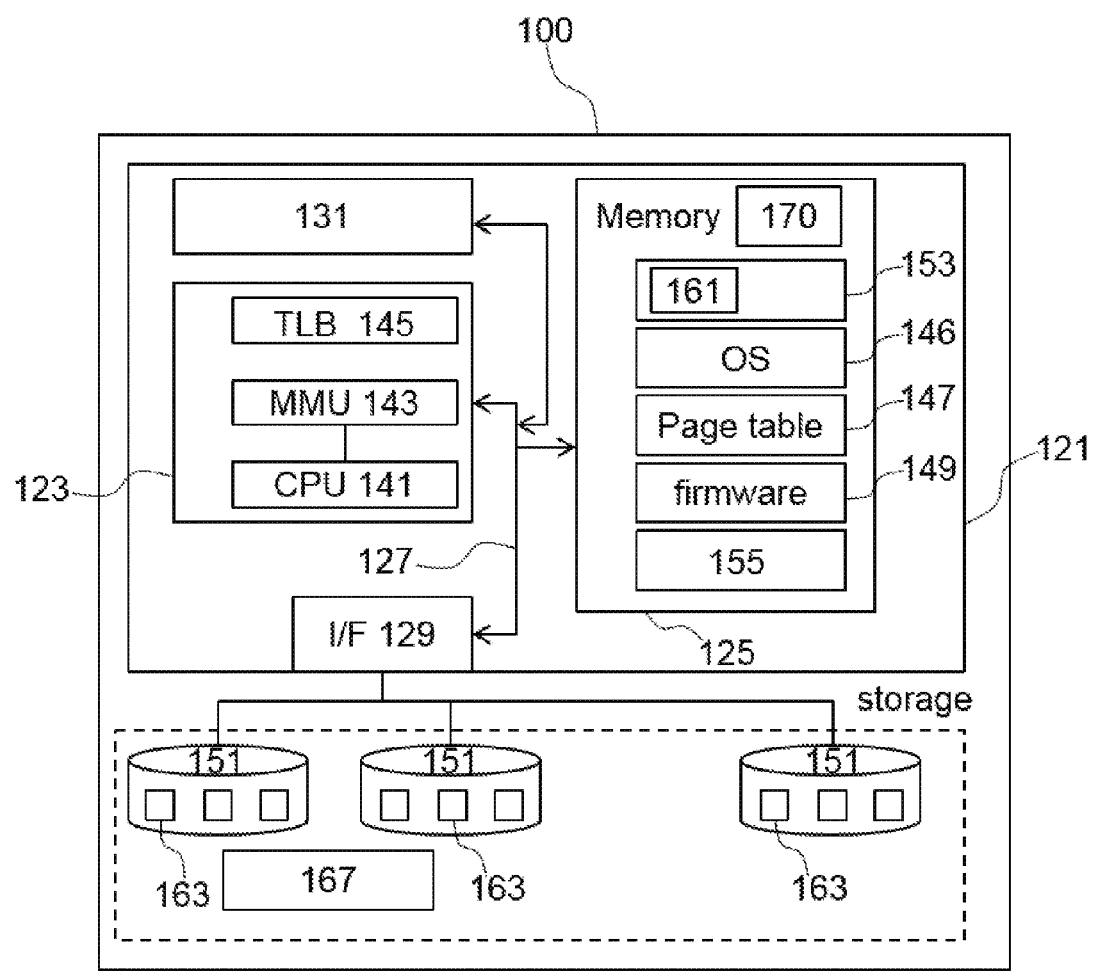
FIG. 1 shows a diagram of an object-based storage system, in accordance with an embodiment of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In conventional computer systems, virtual memory address-to-physical address translations are typically stored in page table entries of a page table. Each page table entry has a page table entry address. The translations are provided by an operating system (OS). For example, when a process requests access to a data in memory, it is the responsibility of the operating system to map the virtual address provided by the process to the physical address of the actual memory where that data is stored.

The present method may enable a memory mapping for data objects in object-based storage (OSD) systems. This may increase the I/O performance, especially when used on large data objects.

With embodiments of the present invention, a cut of the time consuming address translation activities may be made such that the OS is not used to retrieve or generate the physical address, but rather, or in addition, the OS is configured to create an entry having a different structure without indication of the physical address, as described below. This may move away time consuming operating system involvement towards I/O attached devices, i.e., memory and I/O cards.

The present method may further have the advantage of reducing the access latency or time to data objects in the memory unit, especially for systems having multi-level page tables. This is because the time required by the OS to generate the physical address is higher than the time required by the hardware or firmware component to generate the same physical address. Access time is the time required between the request made for a read or write operation until the time the partition of the data object is made available, or written, at the requested location.

Embodiments of the present invention may also allow for operating legacy codes transparently by maintaining at least part of known address translation behaviors. However, when a new special mode is detected by using the new added entries, a new meaning gets assigned to the respective page table entry. The address translation related activities are then managed by hardware or firmware components as the hardware or firmware components should have better knowledge on what to fill in next into the memory unit of the OSD system.

The term "data object" or "object," as used herein, refers to a logical unit (i.e., collection of bytes) of storage with file-like access methods (e.g., read, write) and partitions forming the data object and describing the characteristics of the data object. A device that stores data objects is called an object-based storage device (OSD).

The term "virtual address," as used herein, includes an address referred to as a logical or a linear address that is a non-physical address in a virtual address space defined by software, a processor, or a user process. Depending on the implementation, a virtual address space may or may not be scattered in memory.

As used herein, the term "physical address" or "absolute address" refers to an address that is used to retrieve a content of a physical memory (e.g. the memory unit). A "physical address space" is a space of physical addresses.

The data objects may be provided by (newly) creating the data objects and storing them in the OSD system. In addition, or alternatively, the data objects may be provided by modifying the structure of existing data objects of the OSD system. In one example, each data object of the provided data objects may include a single partition. In another example, each data object of the provided data objects may include more than one partition.

At least part of the data objects may include data objects that have been requested for access. The requests for accessing the at least part of the data objects may be received at once or in multiple requests. In another example, the at least part of the data objects may include objects that have been automatically selected by the OS, e.g. based on their access frequency (selecting objects having highest access frequency as there is a chance that they will be used again and thus before being requested the entries may be added for in the page table). In another example, the at least part of the data objects may be randomly selected.

In one example, a same page table entry of the present method may be used for multiple partitions of the same data object. For example, that same page table entry may be identified in the page table using an address, or a virtual address, of the data object. And the page table entry may be defined such that its content may be used to distinguish between the different partitions of the data object.

In another example, the partition of the first data object may be assigned different entries in the at least one page table. For example, the different entries may be created for respective different processes that have access to the partition of the first data object.

The adding by the OS for a partition of each first data object of at least part of the data objects of an entry in a page table of the at least one page table may be accomplished, in some embodiments, by determining a set of first data objects from the data objects, and adding by the OS for a partition of each first data object of the set of first data objects. The set of first data objects includes at least part of the data objects.

According to one embodiment, the providing of the data objects includes providing the object in accordance with a first category and a second category, wherein the dividing of a data object of the provided objects of the first category results in a partition having user data, wherein the dividing of a data object of the provided objects of the second category results in a partition having indication to objects of the first category or the second category.

For example, a data object of the second category may include a container of data objects. Although the data objects may have different contents based on their category, the data objects are uniformly structured such that same access methods (reads/writes) may be used for the different categories of the data objects. For example, the data objects may be specified in a similar manner using objects ID e.g. 64-bit object ID. This may speed up the access process to the data objects in the OSD system in contrast to a method using different identification methods for the different categories.

Embodiments of the present invention may improve storage management in OSD systems. In particular, embodiments of the present invention may provide a simplified scheme of handling advanced storage features like snapshot, copy-on-write and thin provisioning. For example, there may be no deed of partition, root or collection IDs, as it is the case with conventional methods.

A further advantage may reside in that the present object-based storage may provide an improved scalability in terms of storage space and metadata management.

According to one embodiment, when the first data object is of the first category, an access to the first data object requires an object ID of at least one object of the second category having an indication of the first data object, wherein the first data object is accessed using an object ID of the first data object obtained by accessing the at least one object of the second category.

According to one embodiment, when the first data object is of the second category, an access to the first data object requires an object ID of the first data object, wherein the first data object is accessed via the object ID.

The access to the first data object may be performed by sending a request to the OS for accessing the first data object. The request may refer to a request submitted by a requesting entity specifying the access of a file, a directory, or other file hierarchy. For example, that request for accessing the first data object may be received by the OS before adding the entry for the selected partition of the first data object. The entry may for example be added upon receiving the request for accessing the first data object by the OS. These embodiments may have the advantage of improving the scalability of the present OSD system, i.e., increasing the volume or size of data stored at the OSD system may not affect the present data access method that can still be used.

According to one embodiment, the method further includes assigning to each data object a respective object ID and a reference count, the reference count indicating a count of the number of references by other data objects to the data object. This may have the allow for specifying the data objects uniformly irrespective of their content structure.

According to one embodiment, the method further includes deleting a data object of the data objects whose reference count is zero. This may provide a systematic method for cleaning the OSD system from, e.g., unused data objects. This may particularly be advantageous where a large amount of the data objects are stored at the OSD system.

According to one embodiment, the first data object may be requested in a predefined time period, i.e., an entry may be added in the page table without indication of the physical address for the partition of the first data object that is requested in the predefined time period. For example, the OSD system may operate in two modes, wherein in the first mode the present method is applied. During the first time period the OSD system is switched to function or operate in the first mode.

In some embodiments, the present method may be seamlessly integrated with the existing systems without undue burden. Further, the present method introduces changes that may be transparent as the OSD system after change adheres to previous external interface while changing its internal behavior.

According to one embodiment, the added entry indicates at least one of (referred to as entry attributes): the added entry is a valid or invalid entry; the one of the hardware and firmware components; a read only partition; storage characteristics for storing the partition, the storage characteristics include at least one of storage technology for storing the partition of the first data object, copy on write option, read/write/execute permissions, locking in the memory unit of the partition of the first data object.

For example, the added entry may include multiple indicators each associated with the above listed entry attributes. For that, the added entry may be provided with a plurality of hardware or firmware control data structures (e.g. bits) that represent the indicators. For example, an indicator of the indicators may have a combination of one or more values of one or more bits of the added entry. The values of the bits may be provided by the one of the hardware and firmware components or by the operating system.

This embodiment may provide a page table entry that contains enough information to provide the physical address in accordance with the present disclosure. For example, the one of the hardware and firmware components may use a given virtual address of the first data object and the content of the added entry associated with the given virtual address in order to generate or retrieve the physical address that is associated with the given virtual address via that content. For example, the one of the hardware and firmware components may store a mapping between the content of the added entries and the physical addresses of the data objects associated with the entries. Upon identifying a page table entry using a given virtual address of a given data object, the one of the hardware and firmware components may use the mapping in order to map the content of the identified page table entry in order to find the physical address that is associate with that content i.e. associated with the given virtual address.

The added entry may have a simple internal structure compared to existing entries and may thus be easily discovered by the one of the hardware and firmware components.

According to one embodiment, adding the entry includes: sending by the operating system a request to the hardware and/or firmware component indicating storage characteristics of the respective data block; adding the entry upon receiving an acknowledgment from the hardware or firmware component, wherein the added entry includes information provided by the sender of the acknowledgement. The entry may be created using the received information. This embodiment may be referred to as a negotiation embodiment or negotiation method.

The indicated storage characteristics may include at least part of the entry attributes described above. The added entry includes information on the sender of the acknowledgement and/or the requested storage characteristics.

For example, the negotiation may be performed at once for at least part of the entry attributes described above. In case the negotiation is performed at once for all entry attributes, a single acknowledgement may be received and may be sufficient to add the entry in accordance with the negotiated entry attributes. For example, the OS may request (the one of hardware and firmware components) which read/write/execute permissions can be used for the requested partition and whether the added entry is a valid or invalid entry for the requested partition. The acknowledgment may include values of indicators that are associated with both entry attributes, namely, "read/write/execute permissions" and "valid or invalid entry". In this example, the two entry attributes may be sufficient to create the entry for the requested data block.

In another example, the negotiation may be performed for each attribute of the entry attributes. In this example, the entry may be added when all the acknowledgments associated with respective negotiated attributes are received.

In a further example, the one of the hardware and firmware components may send a rejection to the received request. In this case, the entry may not be added. In another example, in case of receiving a rejection, the operating system may send a further request for requesting other entry attributes. The other entry attributes may or may not include part of the rejected entry attributes.

Further, since the access time depends on the physical characteristics and access mode used for the memory unit in order to access partitions, the present method may provide a controlled method for controlling the access time e.g. by choosing the characteristics e.g. type of storage that may reduce the access time.

Still further, this embodiment may enable the one of the hardware and firmware components to have a full control of the (content of) entry addition or creation compared to the method where the OS can define or propose the content of the entry to be added as described below.

According to one embodiment, the one of the hardware and firmware components includes the sender of the acknowledgement. If one of the hardware or firmware components answered positively after negotiation, it will be used for requesting a given physical address later on once a process requests the virtual address that corresponds to that given physical address. This may save time that would otherwise be required for sending two requests in case one of the hardware or firmware components has no control access to the requested partition of the first data object. For example, if the hardware component has no control access to the partition of the first data object the MMU may have to send again the instruction (that has already been sent to the hardware component) to the firmware component to request the physical address of the partition of the first data object. This may be prevented by the present method.

According to one embodiment, adding the entry includes: registering by the operating system with the hardware and/or firmware components the entry to be added, wherein the registration indicates storage characteristics of the respective partition of the first data object; adding the entry upon receiving a confirmation from the hardware or firmware component. The registering of the entry includes registering values of at least part of bits forming the entry. This embodiment may have the advantages as described above with reference to the negotiation embodiment. Further, this embodiment may provide an alternative method for defining the content of the added entry at the operating system instead of the hardware or firmware components.

According to one embodiment, the added entry includes information indicating the entry as a valid or invalid entry, wherein the obtaining of the first physical address from the memory unit is performed if the first entry is a valid entry.

According to an embodiment, a 1-bit "valid bit" may be used to indicate that the entry is a valid or invalid entry. If the valid bit is set (to 1), the requested partition of the first data object is in the memory unit. The valid bit may be set to either a "1" value to indicate a valid entry, or a "0" value to indicate an invalid entry. Qualifying a 1-bit valid bit instead of a (multi-) valid bit may preserve processor resource and improve performance.

According to one embodiment, the added entry includes information indicating hardware or firmware components, wherein the obtaining of the first physical address includes reading the information for determining the one of the hardware and firmware components from which the first physical address is to be obtained.

According to an embodiment, a 1-bit "hardware (HW)/firmware (FW) bit" may be used to indicate the hardware or firmware component. The HW/FW bit may be set to either a "1" value to indicate hardware component, or a "0" value to indicate a firmware component. Qualifying a HW/FW bit may preserve processor resource and improve performance compared to a case where the source of the first physical address is unknown.

According to one embodiment, the method further includes in case the first entry is an invalid entry, controlling a page fault handler of the operating system to fill the page table with a new entry (in accordance with the present method) or to mark the first entry as a valid entry.

According to one embodiment, the MMU includes a translation lookaside buffer, translation lookaside buffer (TLB), wherein the receiving of the request further includes: detecting a TLB miss for the requested first virtual address. The obtaining of the first physical address is performed if the TLB miss is detected. This embodiment may be advantageous at it may be seamlessly integrated in the existing systems having a TLB implemented feature. Further, this embodiment may save resources that would otherwise be required in case the obtaining of the first physical address is also performed for TLB hits.

According to one embodiment, the obtaining of the first physical address includes: instructing by the MMU the one of the hardware and firmware components to provide the first physical address; creating by the one of the hardware and firmware components an entry in the TLB indicating the first virtual address and the first physical address.

According to one embodiment, the approach further includes: in response to determining that a given entry of the added entries is a least recently used (LRU) entry unregistering the given entry using the one of the hardware and firmware components.

According to one embodiment, the approach further includes determining usage frequency of a given entry of the added entries, in case the usage frequency is smaller than a predefined threshold unregistering the given entry using the one of the hardware and firmware components.

By unregistering the LRU entries, other entries may be inserted instead in the page table. The additional entries may be more frequently accessed. This may have the advantage of improving performances and data access efficiency of the present method.

According to one embodiment, the unregistering includes flushing the TLB by the one of the hardware and firmware components or the operating system. An advantage of flushing the TLB is that the TLB can be kept smaller, which minimizes the time required to search the array.

According to one embodiment, the operating system includes a hypervisor. For example, the OS may run in kernel mode to function as a hypervisor and/or may run limited user functions.

According to one embodiment, adding the entry in the page table includes: instructing one of the hardware and firmware components for loading the partition of the first data object into the memory unit; generating or creating by the one of the hardware and firmware components the physical address for accessing the partition of the first data object into the memory unit.

According to one embodiment, the obtaining of the first physical address includes: instructing the one of the hardware and firmware components for loading the partition of the first data object into the memory unit, generating and storing the first physical address in the memory unit, wherein the first physical address includes an address for accessing the first data object in the memory unit.

According to one embodiment, the obtaining of the first physical address includes: retrieving the first physical address from the memory unit.

According to one embodiment, the obtaining of the first physical address includes: instructing the one of the hardware and firmware components for mapping the virtual address of the partition to a memory page in the memory unit, generating and storing the first physical address, wherein the first physical address includes an address for accessing the memory page in the memory unit.

FIG. 1 shows a diagram of an object-based storage system 100 according to an example embodiment of the present disclosure.

The object-based storage system 100 may include a disk controller 121. The components of disk controller 121 may include, but are not limited to, one or more processors or processing units 123, a storage system 131, a memory unit 125, a disk interface 129 and a bus 127 that couples various system components including memory unit 125 to processor 123. Storage system 131 may include a hard disk drive (HDD). Memory unit 125 may include computer system readable media in the form of volatile memory, such as random access memory (RAM) and/or cache memory.

Disk controller 121 typically includes a variety of computer system readable media. Such media may be any available media that is accessible by disk controller 121, and it includes both volatile and non-volatile media, removable and non-removable media.

Processor 123 may include a central processing unit (CPU) 141 that communicates with memory management unit (MMU) 143. Processor 123 may further include a TLB 145 that stores recently used address mappings in order to avoid accesses to page tables 147 in memory unit 125.

MMU 143 includes address translation circuitry that performs address translation from a virtual page number to a physical page number wherein virtual addresses are translated to physical addresses. A page table 147 may for example be created by OS 146 upon starting a process at object-based storage system 100.

Memory unit 125 may, for example, be provided in the form of read only memory (ROM) and RAM. A firmware 149 such as a basic input/output system (BIOS) may be stored in ROM. Software applications may also be stored in RAM. In one example, RAM component of the memory unit 125 may include OS software 146. Memory unit 125 may further include an application 170. Application 170 may be configured for performing object-level I/O requests. An "object-level I/O request" refers to a request submitted to access (read or write) content of a storage subsystem, where the request specifies the access of a file, a directory, or other file hierarchy.

Object-based storage system 100 may further include one or more storage devices 151. One or more of the storage devices 151 may be an object-based storage device. The disk controller 121 may process input/output (I/O) requests from the host computer 101. The I/O request may be based on the object-based storage device commands. The disk interface 129 is used to connect the storage devices 151 and the disk controller 121. Each of the storage devices 151 processes the I/O requests in accordance with object-based storage device commands such as commands described herein.

The storage devices 151 may include data for a plurality of data objects 161 in a plurality of physical blocks 163. The data objects 161 may be identified within the OS 146 using for example specific IDs or addresses of an OS metadata repository 153 that the OS 146 itself needs to interpret. Directories and file names used by a user may be mapped to these IDs by the OS 146. Using information about the data objects 161, logical addresses for the physical blocks 163 used to store the data of the data objects 161 may be identified in FW/HW metadata repository 167. Data may be obtained/retrieved from particular ones of the physical blocks 163 based on the identified logical addresses; and may be stored in memory unit 125.

Memory unit 125 may further include an address repository 155 for storing at least physical addresses as determined with the present method.

A hardware component as used herein may include processor 123 and/or a custom logic chip and/or an field-programmable gate array (FPGA) that is connected to the processor 123 and memory unit 125.

In another example, the object-based storage system 100 may enable a virtualization environment. The hypervisor may run or control one or more virtual machines (or guest machines).

What is described below with reference to OS 146 may hold true for the hypervisor. For example, the method performed by the OS 146 in order to provide access to objects as described herein may also be performed by the hypervisor.

The operation of the object-based storage system 100 will be described in details with reference to FIGS. 2-10.

Figure 2:
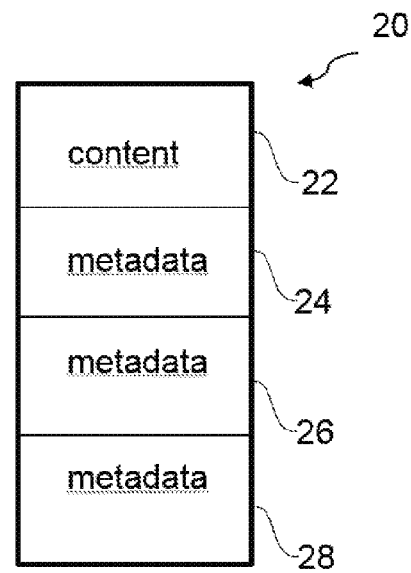
FIG. 2 shows a diagram of a data object, in accordance with an embodiment of the present invention.

FIG. 2 shows a diagram of a data object 20 according to an example embodiment of the present disclosure. Data object 20 may be, for example, a data object, such as data object 161 of FIG. 1. The data object 20 may include one or more partitions. In this example, the data object 20 is shown as containing four partitions 22, 24, 26, and 28. Partition 22 may include content of the data object 20. For example, if the data object is a user object, content of the data object 20 may include the data. In another example, if the data object 20 is a container or a collection of objects, the partition 22 may indicate the objects contained in the collection. Partitions 24-28 may include metadata indicative of the data object 20. In the example shown in FIG. 2, the metadata describing the data object 20 may be distributed over three partitions 24-28; however, in other embodiments, the metadata may be distributed over a greater or fewer number of partitions. For example, the metadata may be provided in a single partition, such that the data object 20 contains two partitions. The metadata may, for example, include a user name that identifies the user name of data object 20, the size of data object 20, the time that data object 20 was created and/or modified. The modification and access of data object 20 may include modification and access respectively of partition 22 and/or a partition 24-28. The metadata may be divided into different categories, wherein each metadata category is assigned to a respective partition 24-28. For example, the metadata may be divided into static metadata and temporal metadata each of them may be assigned a corresponding partition 24-28. The data object 20, according to the present disclosure, may be created as new data objects or may be generated by modification of existing data objects of the object-based storage system 100. In one example, the partitions 24-28 may include OD1: inode data, extended attributes, and an access list respectively.

Figure 3:
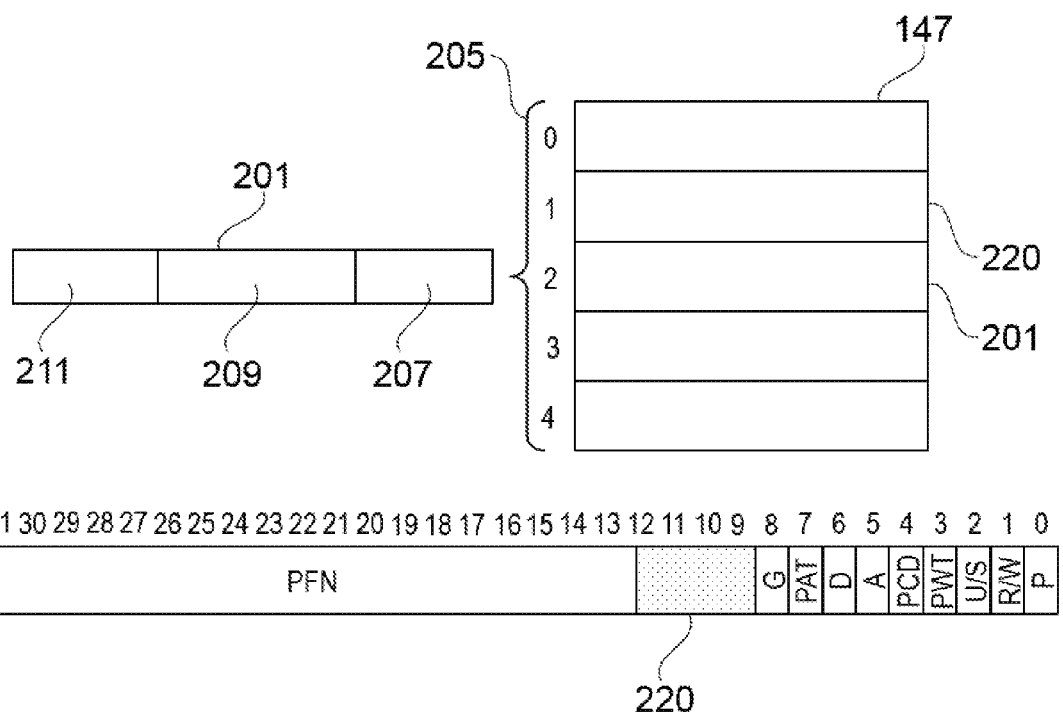
FIG. 3 illustrates an exemplary content of a page table, in accordance with an embodiment of the present invention.

FIG. 3 illustrates an exemplary content of page table 147 in accordance with present disclosure. FIG. 2 shows an example page table entry 201 of the page table 147 for a given partition 22-28 of the data object 161. For example, for each partition of each data object 161 the OS 146 may be configured to create a respective page table entry having the structure of the page table entry 201. For example, a page table entry 201 may be created upon receiving a request to access a partition of a data object 161, wherein the partition is stored on disk e.g. storage devices 151.

For example, the page table entry 201 may be created for a partition 22-28 that is requested in a predefined time period. The predefined time period may be a period during which a user may require a faster access to that partition. In contrast to conventional page table entries, the page table entry 201 is provided without indication of a physical address e.g. there is no indication of a page frame number (PFN).

The page table entry 201 may include at least one field of one or more bits. The structure of the page table entry 201 may be newly determined (e.g. from scratch) or may be determined based on existing structures of page table entries as described below.

In one example, a first field 207 may indicate that the page table entry 201 is a valid or invalid entry. The first field 207 may include a 1-bit "valid bit". The valid bit may be set to either a "1" value to indicate a valid entry, or a "0" value to indicate an invalid entry. A second field 209 of the page table entry 201 may indicate that the page table entry 201 is a special entry in that it has a structure as defined by the present method. The second field 209 may include a 1-bit "special entry bit". The special entry bit may be set to "1" value to indicate that the entry is a special entry. The values of the one or more bits in the second field 209 may define an I/O key value, which can be used as an identification number for the requested partition 22-28. This second field 209 may particularly be advantageous in case the page table 147 includes page table entries such as page table entry 220 having different structure than the page table entry 201. A third field 211 of the page table entry 201 may indicate the one of the hardware and firmware component that is able to provide the physical address that corresponds to the page table entry 201. The third field 211 may include a 1-bit "HW/FW bit" to indicate the hardware or firmware component. The HW/FW bit may be set to either a "1" value to indicate hardware component, or a "0" value to indicate a firmware component. Fields 207-211 are shown as an example; however, the present approach may provide the page table entry 201 with more or less than three fields without an indication of a physical address of the partition of the data object 161 to which the page table entry 201 is associated.

In another example, the page table entry 201 may be generated based on the structure of existing page table entries. This may be done by, for example, zeroing bits that indicate the PFN in the existing structure. And, a bit of the existing structure may be reversed to indicate that the page table entry 201 is a special entry (e.g. for the system z architecture either bit in the range of bits 56-63 may be reversed). Further, a bit of the existing structure may be used to set values for indicating whether the entry is valid or not valid.

The present method may provide another structure for the added page table entries such as page table entry 220 for a data block 131B. For example, the page table entry 220 may have a structure according to the x86 architecture. Page table entry 220 may contain a present bit (P); a read/write bit (R/W) which determines if writes are allowed to this page; a user/supervisor bit (U/S) which determines if user-mode processes can access the page; a few bits (PWT, PCD, PAT, and G) that determine how hardware caching works for these pages; an accessed bit (A) and a dirty bit (D); and finally, the PFN itself. The page table entry 220 may be created for only part of the data blocks. In one example, the page table entry 220 may not be created.

Figure 4:
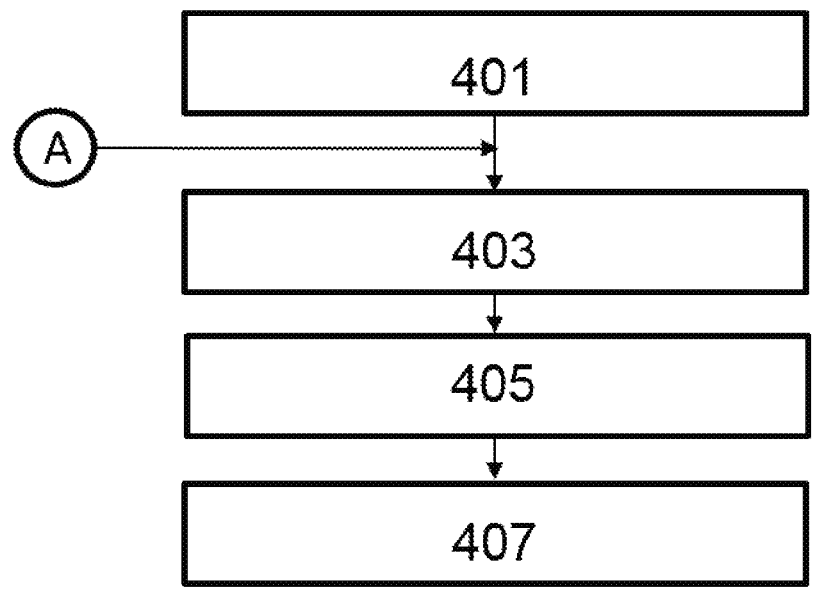
FIG. 4 is a flowchart of an exemplary method for object access in the object-based storage system, in accordance with an embodiment of the present invention.

FIG. 4 is a flowchart of an exemplary method for object access in an object-based storage system 100.

In step 401, the OS 146 may add for a partition 22-28 of a first data object 161 an entry in a page table 147. In one example, the OS 146 may add an entry in the page table 147 for each partition of the partitions of the first data object 161. In another example, the OS 146 may add an entry in the page table 147 for a selected partition of the partitions 22-28. The selection of that partition may for example be indicated in a request to access the first data object 161 that is received by the OS 146. The page table 147 may be the page table that has been created for a process that requests access to partitions 22-28 of the first data object 161.

For example, the OS 146 may add the entry upon receiving from the process a request to access the partition 22-28 of the first data object 161. In another example, the OS 146 may add the entry automatically upon storing the first data object 161 on the object-based storage system 100. This may be advantageous in particular if it is predicted that the partitions 22-28 of the first data object 161 are going to be used, e.g., by a process that is running or a process that is expected to start running at or after the time at which the entry is added. The expected process may for example be executed periodically in accordance with a time-based job schedule managed by a Cron. This may speed up the processing time of those processes.

The added entry may have a structure as described with reference to page table entry 201 of FIG. 3. The added entry may represent the partition of the first data object 161.

For example, step 401 may be performed or repeated for each data object of at least part of the data objects 161 that are stored at the object-based storage system 100. For example, a second entry may be added in the page table 147 for a partition of a second data object 161.

The MMU 143 may receive in step 403 a request of a partition of the first data object 161.

For example, the request of the first data object may be received by the MMU 143 from the OS 146. In another example, the request of the first data object may automatically be generated as soon as the entry has been added in the page table 147. The request may for example indicate a virtual address of the first data object (as the first data object may have been mapped into virtual memory).

The MMU 143 may check (step 405) for the partition of the first data object in the page table 147 that a first entry of the added entries represents the partition. For that, the MMU 143 may, for example, generate an index (205) of the virtual address in order to access the page table 147. Using the generated index, the MMU 143 may read entry of the page table 147 that is indicated by the index and may check if the read entry has a structure of the page table entry 201 or not. For example, the MMU 143 may check if the reversed bit value is there in the read entry. In other words, the MMU 143 may check whether the read entry has an indication of a physical address (PA) e.g. PFN or not.

In case the entry being read does not indicate a physical address, the MMU 143 may obtain in step 407 a physical address of the requested partition of the first data object from one of the hardware and firmware 149 components. For example, the one of the hardware and firmware 149 components may be randomly selected. In another example, the read entry may indicate the one of the hardware and firmware 149 components e.g. by reading the HW/FW bit that indicates that the one of the hardware and firmware 149 components is able to provide a physical address for the requested partition of the first data object.

The obtaining of the physical address may be performed by instructing by the MMU 143 the one of the hardware and firmware 149 components to provide the physical address. The MMU 143 may thus obtain the physical address from the one of the hardware and firmware 149 components and may access the partition of the first data object 161 in the memory unit 125 using obtained physical address.

In one example, the first data object may include two partitions. A first partition may include data and a second partition may include metadata. Upon receiving a request e.g. from a user application to access the first data object, steps 401-407 may first be performed for the second partition. And, in case the metadata after being read indicates that the user of the user application and/or the user application are allowed to access data of the first partition then steps 401-407 may be repeated for the first partition.

Figure 5:
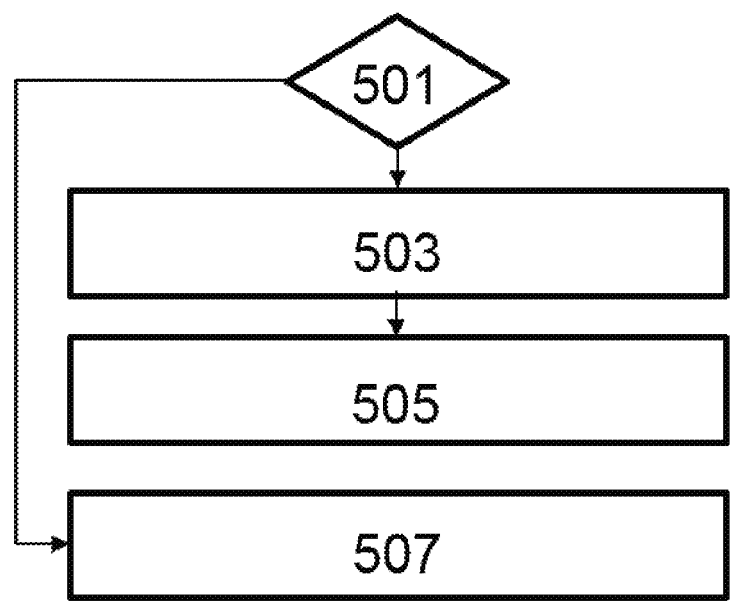
FIG. 5 is a flowchart of steps for obtaining a physical address, in accordance with an embodiment of the present invention.

FIG. 5 is a flowchart of a method for obtaining the physical address further detailing step 407. The MMU 143 may determine (inquiry 501) that the requested partition of the first data object is not stored on the memory unit 125. And, upon determining that the requested partition of the first data object is not stored on the memory unit 125, the MMU 143 may instruct, in step 503, the one of the hardware and firmware components for loading the partition of the first data object into the memory unit from the storage device 151. In step 505, the physical address may be generated, e.g., by the one of the hardware and firmware components and may be stored in the memory unit 125, e.g., in address repository 155. In another example, the MMU 143 may instruct the one of the hardware and firmware components for mapping the virtual address of the partition to a memory page in the memory unit, and generating and storing the first physical address, wherein the first physical address includes an address for accessing the memory page in the memory unit 125. The partition may be physically loaded into the memory unit 125 in a later stage, e.g., if a page fault is detected when accessing the first physical address.

If however, the MMU 143 determines (inquiry 501) that the requested partition of the first data object is stored on the memory unit 125, the MMU may obtain in step 507 the physical address from the one of hardware and firmware components, wherein the one of hardware and firmware components retrieves the physical address from address repository 155 of the memory unit 125 and provides the physical address to the MMU 143.

Figure 6:
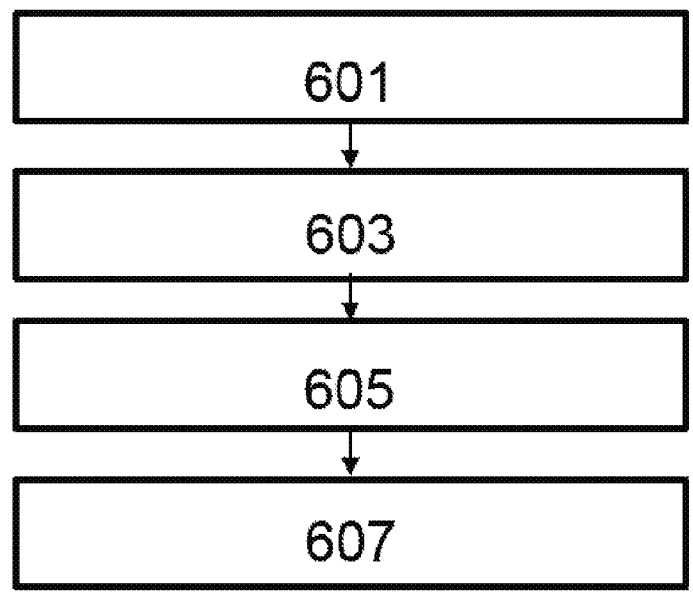
FIG. 6 is a flowchart of steps for creating or adding an entry in the page table, in accordance with an embodiment of the present invention.

FIG. 6 is a flowchart of an exemplary method for creating or adding an entry in a page table, e.g., page table 147. The page table 147 may be created upon starting one or more processes or applications at the object-based storage system 100.

For example, the OS 146 may receive in step 601 a request to access a partition of a data object 161 such as a file, e.g., from the process that is started. For example, the data object 161 may be accessed via a filename. The OS 146 may use metadata stored in OS metadata repository 153 to determine an object ID associated with the filename.

The OS 146 may negotiate the content (e.g., values of bits) of the entry to be added in the page table 147 for the partition of the data object 161. For that, the OS 146 may send, in step 603, a request to the hardware and/or firmware 149 component. The request indicates storage characteristics or entry attributes of the data object 161. The entry attributes may include: added entry is a valid or invalid entry; an indication of the one of the hardware and firmware components; a read only flag for the data object 161; storage technology for storing the data object 161, copy on write option, read/write/execute permissions, locking in the memory unit 125. Step 603 may be performed upon receiving the request of step 601. I another example, step 603 may be performed for adding an entry for a given data object 161 of the stored data objects.

In case the OS 146 includes a Linux OS, the mmap system may be modeled so as to enable this negotiation method. For example, the request may be sent as a mmap instruction, CreateFileMapping function of Microsoft® Windows®, an AIX® mmap instruction, z/OS® unix system services mmap, etc.). For example, the OS 146 provides an mmap call for establishing mappings from an input address space/virtual address of the data object 161 to a portion of the memory unit 125 associated with the data object 161, and assigning certain attributes (of the entry attributes) to the page or entry to be added or created. Those attributes describe at least the requested storage characteristics.

In step 605, the OS 146 may add the entry if the OS 146 receives an acknowledgment from the hardware or firmware component. The acknowledgement may indicate values for one or more bits of the added entry that indicate each of the requested storage characteristics.

In step 607, the hardware or firmware component that has sent the acknowledgement may load the data blocks 163 associated with the data object 161 from the storage devices 151 into the memory unit 125, e.g., in the form of pages. The loading may be performed if the partition of the data object is not stored in the memory unit 125. The physical address of the data of the data object 161 that is stored in the memory unit 125 may be stored on the address repository 155 in association with the object ID of the data object 161 or in association with the I/O key defined in the second field 209 that is indicative of the added entry. In case of a system including a TLB, step 605 may further include adding an entry in the TLB 145. The entry indicating the virtual address of the data object 161 and the physical address of the partition of the data object 161.

Figure 7:
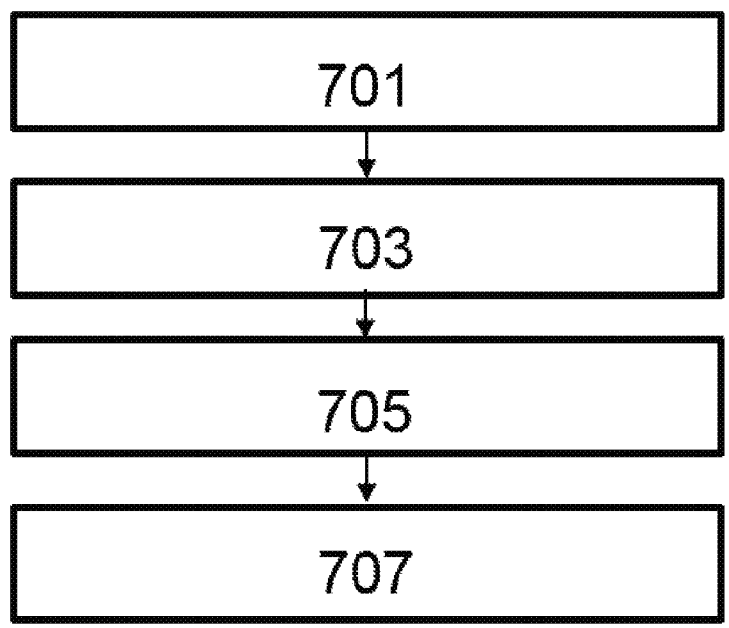
FIG. 7 is a flowchart of steps for creating or adding an entry in the page table, in accordance with an embodiment of the present invention.

FIG. 7 is a flowchart of an exemplary method for creating or adding an entry in a page table, e.g., 147. The page table 147 may be created upon starting one or more processes or applications at the object-based storage system 100.

For example, the OS 146 may receive, in step 701, a request to access a partition of a data object 161 such as a file e.g. from the process that is started. For example, the data object 161 may be accessed via a filename. The OS 146 may use metadata of the OS metadata repository 153 to determine an object ID associated with the filename.

The OS 146 may negotiate the content (e.g. values of bits) of the entry to be added in the page table 147 for the partition of the data object 161. For that, the OS 146 may register in step 703 with the hardware and/or firmware 149 components the entry to be added, wherein the registration indicates storage characteristics of the partition of the data object 161. The registering includes defining or suggesting by the OS 146 values of one or more bits of the entry to be added. Such values are indicative or reference to the requested storage characteristics. In case of the OS 146 includes a Linux OS the mmap system may be modeled so as to enable this registration approach. For example, the request may be sent as a mmap instruction.

In step 705, the OS 146 may add the entry if the OS 146 receives a confirmation from the hardware or firmware components of the suggested values and associated storage characteristics.

In step 707, the hardware or firmware component that has sent the acknowledgement may load the data blocks 163 associated with the data object 161 from the storage devices 151 into the memory unit 125, e.g., in the form of pages. The loading may be performed if the partition of the data object is not stored in the memory unit 125. The physical address of the data of the data object 161 that is stored in the memory unit 125 may be stored on the FW/HW metadata in association with the object ID of the data object 161 or in association with the key i.e., (second field 209) that is indicative of the added entry. In case of a system including a TLB, step 405 may further include adding an entry in the TLB 145. The entry indicating the virtual address of the data object 161 and the physical address of that data object 161.

Figure 8:
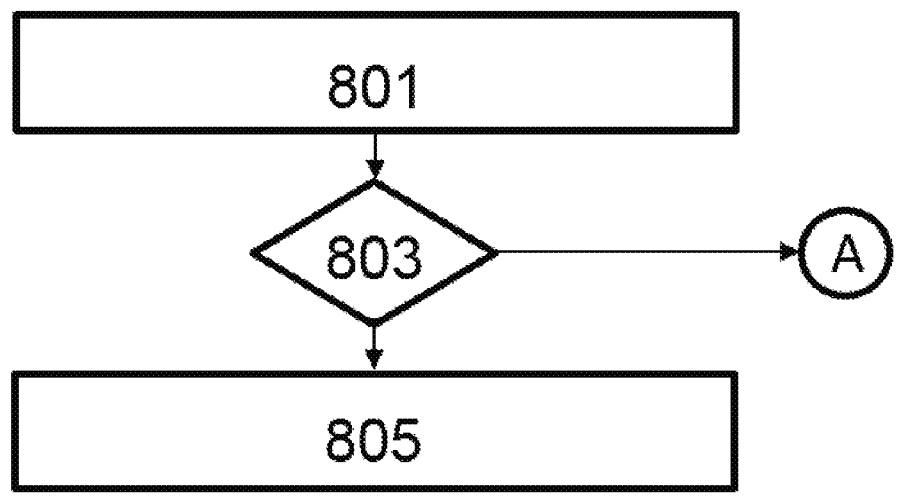
FIG. 8 illustrates steps for accessing a partition of a data object, in accordance with an embodiment of the present invention.

FIG. 8 illustrates an exemplary method for accessing a partition 22-28 of a data object 161, which is stored in the memory unit 125.

MMU 143 may receive a request of a partition 22-28 of a data object 161 via a virtual address. And in response to receiving the request, the MMU 143 may access (step 801) the TLB 145 for determining whether (inquiry 803) there is an entry in the TLB 145 that includes the requested virtual address.

In case of a TLB hit (inquiry 803), i.e., the requested virtual address is included in the TLB 145, the MMU 143 may use the physical address that is associated with the requested virtual address in the TLB 145 in order to access (step 805) the requested partition in the memory unit 125.

In case of a TLB miss, i.e., the requested virtual address is not in the TLB 145, the method steps 403-407 may be performed (see FIG. 4). In this case, the one of the hardware and firmware components may create an entry in the TLB 145 indicating the requested virtual address and the associated physical address. The MMU 143 may then (re)read the TLB 145 to get the physical address and access the requested partition 22-28 of the data object 161 in the memory unit 125.

Figure 9:
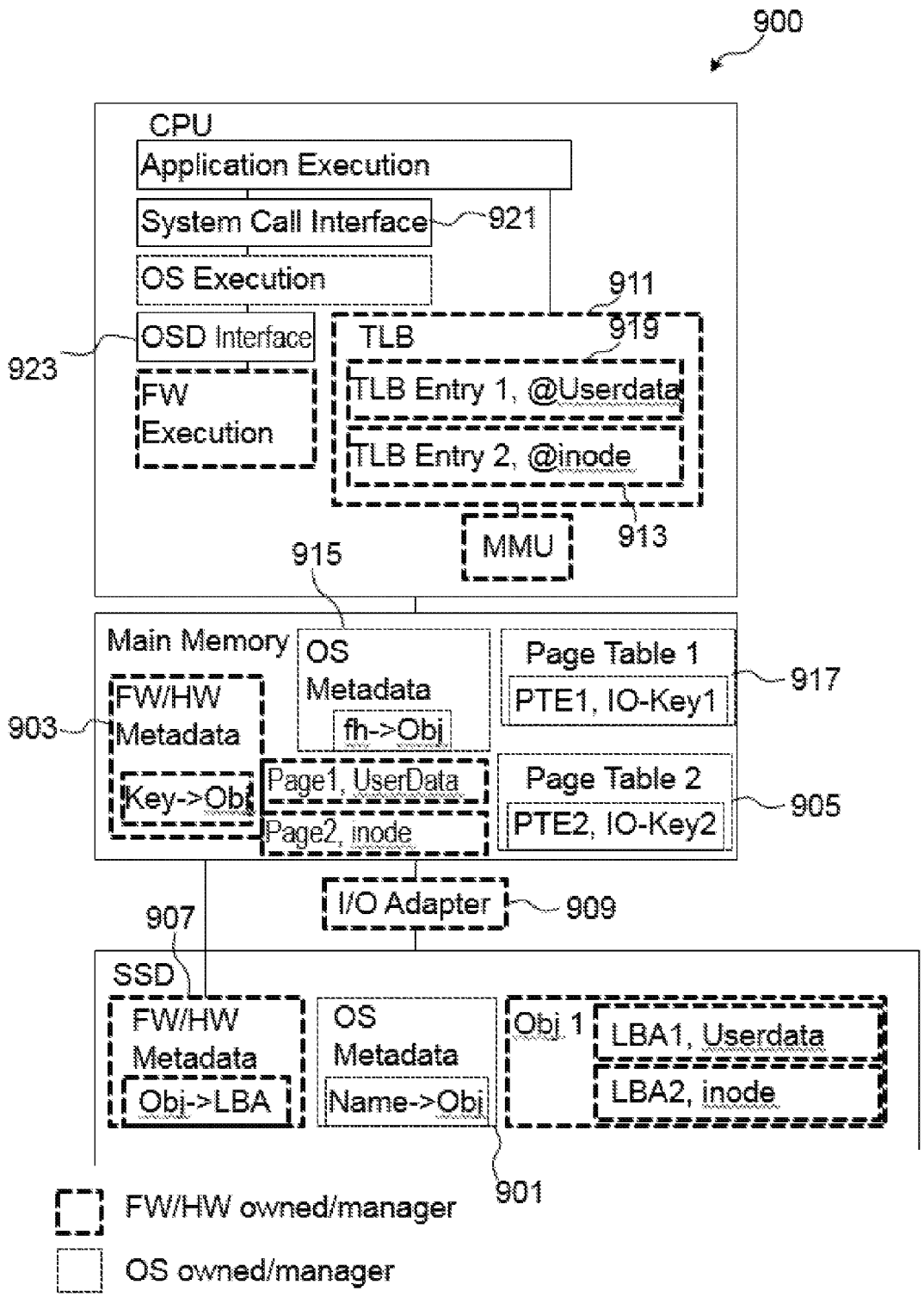
FIG. 9 shows a diagram of an alternate exemplary object-based storage system, in accordance with an embodiment of the present invention.

FIG. 9 shows a diagram of an object-based storage system 900 (such as object-based storage system 100) according to an example embodiment of the present disclosure. It should be noted that this is but one example, and the steps may be performed in a different sequence. Similarly a greater number or fewer number of steps are contemplated by embodiments of the present invention.

First, an application "App" (such as application 170) may send a request to OS 146 to open an existing file having a given filename.

Next, the OS may find an object ID obj1 in OS metadata 901 based on the filename. The OS metadata 901 may include a mapping between object IDs and filenames. The object having ID obj1 may have at least two partitions OD1 and OD2 (such as partitions 22-28), wherein the partition OD1 includes the content of object obj1, while OD2 includes metadata such as inode of object obj1.

Next, the OS 146 may request one of the FW and HW components (e.g. 123 and 149) for a key to be allocated for partition OD2 of object obj1. This may be done by, for example, using the following command: "alloc_io_key" 2 for obj1 (OD2). This command is described below. The one of the FW and HW components may be selected as described above e.g. randomly.

Next, the one of the FW and HW component may allocate a key "key2" to OD2 of object obj1 in response to that request received from the OS. For example, the key may include one or more values of respective one or more bits, which may be used by the OS to create a page table entry for the requested object.

Next, the one of the FW and HW components may store the allocated key "key2" in association with object ID obj1 in Key→Obj repository of FW/HW metadata 903.

Next, the one of the FW and HW components may increment reference count ref_count on object having object ID obj1. This may for example prevent deleting the object obj1 while being read.

Next, the one of the FW and HW components may return the key "key2" to OS 146

Next, the OS may enter key2 for OD2 to PTE2 for kernel address space PT2 to later on access inode at virtual address 2. In other words, the OS may create a page table entry in page table 905 that is created for the kernel process. The page table entry may include key2 (also referred to as I/O-key2)

Next, OS 146 may request CPU to load access to inode OD2. For that, the one of the FW and HW components may get control via the MMU, because the MMU detects that a TLB entry associated with OD2 of obj1 is not there yet. For that the MMU may instruct the FW/HW components to perform as follows:

Next, the one of the FW and HW components may allocate a memory page "Page2" from a pool containing unused memory pages Next, the one of the FW and HW components may look up for a logical block number LBA2 that is associated with OD2 of obj1 through Obj→LBA mapping repository 907 (or 161).

Next, the one of the FW and HW components may transfer the logical block number LBA2 to the allocated memory page Page2 by using I/O Adapter 909.

Next, the one of the FW and HW components may enter address of Page2 into entry TLB2 913 of the TLB 911.

Next, the one of the FW and HW components may trigger an instruction retry

Next, the OS may actually work on inode data and may do checks

Next, the OS may allocate a filehandle fh and stores fh in fh→Obj repository 915 in association with object ID obj1. The OS may enable the application App access to the requested object by returning to the application App the filehandle fh and a notification that the opening process is successfully done.

In another example operation of the object-based storage system 100 the following execution is described, that may further occur after the previous steps described and may, for example, execute if the application App is allowed to access the Userdata or OD1 of object obj1.

First, the application App may request the OS for a memory map of a file having a filehandle fh, a virtual address vaddr1 and a file offset fileoffset1.

Next, the OS may find object ID Obj1 through fh→Obj mapping of the fh→obj repository 915.

Next, the OS may request the one of the FW and HW components to allocate a key "key1" for partition OD1 of object obj1 e.g. using the command: "alloc_io_key" 1 for obj1 (OD1).

Next, the one of the FW and HW components may allocate a key "key1" for that partition OD1 in response to the request received from the OS.

Next, the one of the FW and HW components may store key1 and obj1 in Key→Obj repository of FW/HW metadata 903

Next, the one of the FW and HW components may increment reference count ref_count on object obj1.

Next, the one of the FW and HW components may return key1 to OS.

Next, the OS may enter key1 for OD1 to PTE1 for application address space "Page Table 1" to lateron access Userdata at virtual address vadd1. In other words, the OS may create a page table entry in page table 917 that includes key1.

Next, the OS may return a success message to the application App.

Next, the application App may request CPU for load access to Userdata OD1 of object obj1, and FW/HW component may get control via the MMU, because the MMU detects that a TLB entry associated with OD1 of obj1 is not there yet.

Next, the one of the FW and HW components may allocate Page1 from FW pool.

Next, the one of the FW and HW components may look up for the logical block number LBA1 associated with OD1 of object obj1 through Obj→LBA mapping repository 907.

Next, the one of the FW and HW components may transfer LBA1 to Page1 by using I/O Adapter 909.

Next, the one of the FW and HW components may enter Address of Page1 into TLB entry TLB1 919.

Next, the one of the FW and HW components may trigger an instruction retry.

Next, the application App may actually work on Userdata OD1.

The communication between application and OS may for example be performed via system call interface 921. The OS may communicate with the FW/HW component via OSD interface 923.

Figure 10:
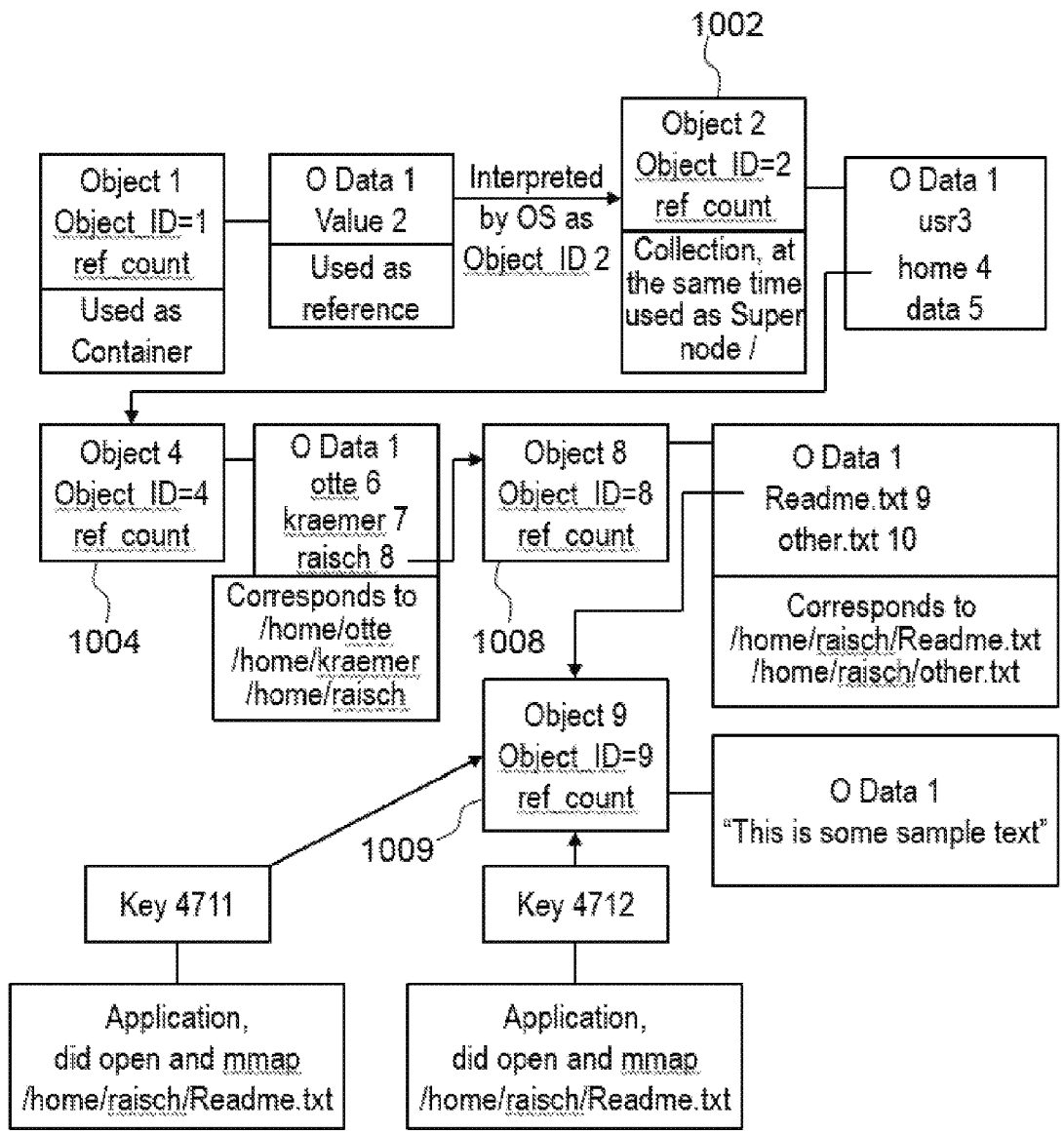
FIG. 10 shows a flow diagram of steps for accessing data objects, in accordance with an embodiment of the present invention.

FIG. 10 shows a flow diagram of an exemplary approach for accessing objects in accordance with the present disclosure. The execution flow of the exemplary method is described as follows. It should be noted that this is but one example approach for accessing objects. In other embodiments, the described steps may occur in a different order or additional/fewer steps may be present.

First, the OS (e.g., OS 146) may be configured to use Object 1002 as super node Next, applications such as Emacs may open file "/home/raisch/Readme.txt."

Next, since the request is triggered by a user application, the partition that contains user data may be searched. For that, OS 146 may look up in Object 1002, for content of OD1. OD1 of object 1002 includes directories "home," "usr," and "data". The numbers 3, 4 and 5 refer to object IDs of the directories. The OS 146 may check that the user application is allowed to access the Userdata in OD1. For that the OS may read partition OD2 of the requested object that contains inode data.

Next, OS 146 may then look up in Object 1004 (having object ID 4). The partition OD1 of object 1004 may be looked up. OD1 of object 1004 may include directories "raisch," "otte," and "Kraemer". The numbers 6, 7 and 8 refer to object IDs of that directories. OS 146 may find object ID 8 that corresponds to "raisch."

Next, OS 146 may look up in Object 1008 (having object ID 8). The partition OD1 of object 1008 may be looked up. OS 146 may find file "readme.txt." The numbers 9 and 10 refer to object IDs associated with files in object 8. File or object readame.txt has an object ID 9.

Next, OS 146 may create a filehandle and may store object ID 9 in association with the filehandle in fh→obj repository 915. The content of the requested file may be found in OD1 of object 1009.

Next, application 170 accesses and creates mmap, (with object 1009 as input parameter).

Next, the one of the FW and HW component may generate a Key, e.g., 4711 for object having ID 9.

Next, the one of the FW and HW component FW/HW may install a Key→Obj table entry in Key→Obj repository of FW/HW metadata 903 indicating the key and the object ID: 4711→9.

Next, OS 146 may add key 4711 in a page table, e.g., 917 associated with the application.

Next, application 170 accesses the page via the memory (e.g. as described in FIG. 9).

Next, the one of the FW and HW component gets 4711 from PTE of the page table.

Next, the one of the FW and HW component looks up 4711, and finds object ID 9.

Next, application 170 sees "This is some sample text" in memory at the accessed page.

The following are example FW/HW primitives in accordance with the present disclosure. In this example of FIG. 10, "in" refers to input of the command and "out" refers to output of the command.

Create object(in: object_to_inherit_from, out: object_id). This may create an object with ID object_id.

Destroy object(in: object_id). This may delete object having object_id.

Query object(in: object_id, out: actual_size, refcount). This may query the object having ID object_id and may return or output the actual size of the object and reference count number of the object.

Resize object(in: object_id, object_data_nr,new_size) (e.g. grow/shrink object max offset). This may resize the partition object_data_nr of the object having id object_id to a new length. This may for example, be followed by changing the key that has been created for the partition object_data_nr.

Punch object(in: object_id, object_data_nr,from,to). This may zeroize data within partition object_data_nr for object having id object_id, for sparse files.

Create Container(in: object_id, out: partition_id). partition_id is the ID of the container that is created.

Destroy Container(in: partition_id).

Create Collection(in: object_id, out: collection_id).

Destroy Collection(in: collection_id).

alloc_IO_KEY(in: object_id, object_data_nr, vaddr_start, vaddr_end,file_offset, out: I/O_key). This may request an allocation of a key for partition object_data_nr of object having id object_id.

change_IO_key(in: (object_id, object_data_nr), I/O_key, new_vaddr_start, new_vaddr_end,file_offset). This may request to change an existing key of for partition object_data_nr of object having id object_id.

free_IO_KEY(in: (object_id, object_data_nr). This may release I/O_key e.g. for a reuse and the reference count of object_id is decremented.

the access to a given partition through TLB/MMU may be performed as follow:

if (FWTABLE[I/O_key] exists && pfault_addr>FWTABLE [I/O_key].vaddr_start && pfault_addr<FWTABLE [I/O_key].vaddr_end object_offset=(pfault_addr-FWTABLE[I/O_key].vaddr_start)+FWTABLE[I/O_key].file_offset, wherein FWTABLE may include the FW/HW metadata 903.

The present method may include, for example, when an atomic change of data happens for a given object, and increment or decrement of reference counts of related objects of the given object may be serialized to another operations to objects.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGA, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

What is claimed is:

1. A method for determining a physical address for object access in an object-based storage device (OSD) system, the method comprising:
    dividing, by one or more processors, a first data object into one or more partitions, including at least a first partition, and providing each partition for storage as individual stored objects in an OSD system;
    generating, by one or more processors, a first entry in a page table, based, at least in part, on:
        receiving, by one or more processors, an input/output key allocated from at least one of a firmware component and a hardware component; and
        adding, by one or more processors, the input/output key in the first entry in the page table, wherein:
            the input/output key represents the first partition; and
            the first entry in the page table does not include an indication of a physical address where the first partition is stored;
    receiving, by a memory management unit (MMU) of the OSD system, a virtual address to access the first partition;
    responsive to receiving the virtual address to access the first partition, determining, by the MMU, that the input/output key included in the first entry of the page table represents the first partition; and
    retrieving, by at least one of the hardware component and the firmware component, the physical address of the first partition based, at least in part, on utilizing a memory map stored by at least one of the hardware component and the firmware component corresponding to the input/output key.

2. The method of claim 1, wherein dividing the first data object into one or more partitions comprises:
    dividing, by one or more processors, the first data object into at least a first partition and a second partition, wherein the first data object includes metadata, and wherein the second data object includes data content.

3. The method of claim 1, further comprising:
    assigning, by one or more processors, an object identification (ID) and a reference count to the first data object, wherein the reference count is a count of a number of references to the first data object by one or more other data objects.

4. The method of claim 3, further comprising:
    determining, by one or more processors, that the reference count is zero; and
    responsive to determining that the reference count is zero, deleting, by one or more processors, the first data object.

5. The method of claim 1, further comprising:
    instructing, by the MMU, the one of the hardware component and firmware component to:
        load the first partition into a memory unit;
        generate the physical address, wherein the physical address comprises an address for accessing the first data object in the memory unit; and
        store the physical address in the memory unit.

6. The method of claim 1, wherein the physical address of the first partition is retrieved from the memory unit.

7. The method of claim 1, wherein the MMU includes a translation lookaside buffer (TLB), and wherein receiving the first request of the first partition further comprises:
    detecting a TLB miss for the first request of the first partition.

8. The method of claim 7, further comprising:
    instructing, by the MMU, the one of the hardware component and the firmware component to provide the physical address of the first partition; and
    creating, by one of the hardware component and the firmware component, a second entry in the TLB indicating the first partition and the physical address.

9. The method of claim 1, wherein adding the first entry comprises:
    sending, by one or more processors, a second request to one of the hardware component and the firmware component for adding the first entry, the second request including storage characteristics of the first data object; and
    subsequent to receiving an acknowledgment from one of the hardware component and the firmware component, adding, by one or more processors, the first entry, wherein the first entry further includes information about the sender of the acknowledgement.

10. The method of claim 1, wherein adding the first entry comprises:
    registering, by one or more processors, the first entry with one of the hardware component and the firmware components, wherein the registration indicates storage characteristics of the first data object; and subsequent to receiving a confirmation from one of the hardware component and the firmware component, adding, by one or more processors, the first entry.

11. The method of claim 1, wherein the first entry includes at least one of: validity of the first entry, the one of the hardware component and the firmware component, a read-only partition, and storage characteristics for storing the first partition.

* * * * *